United States Patent Office 2,789,020
Patented Apr. 16, 1957

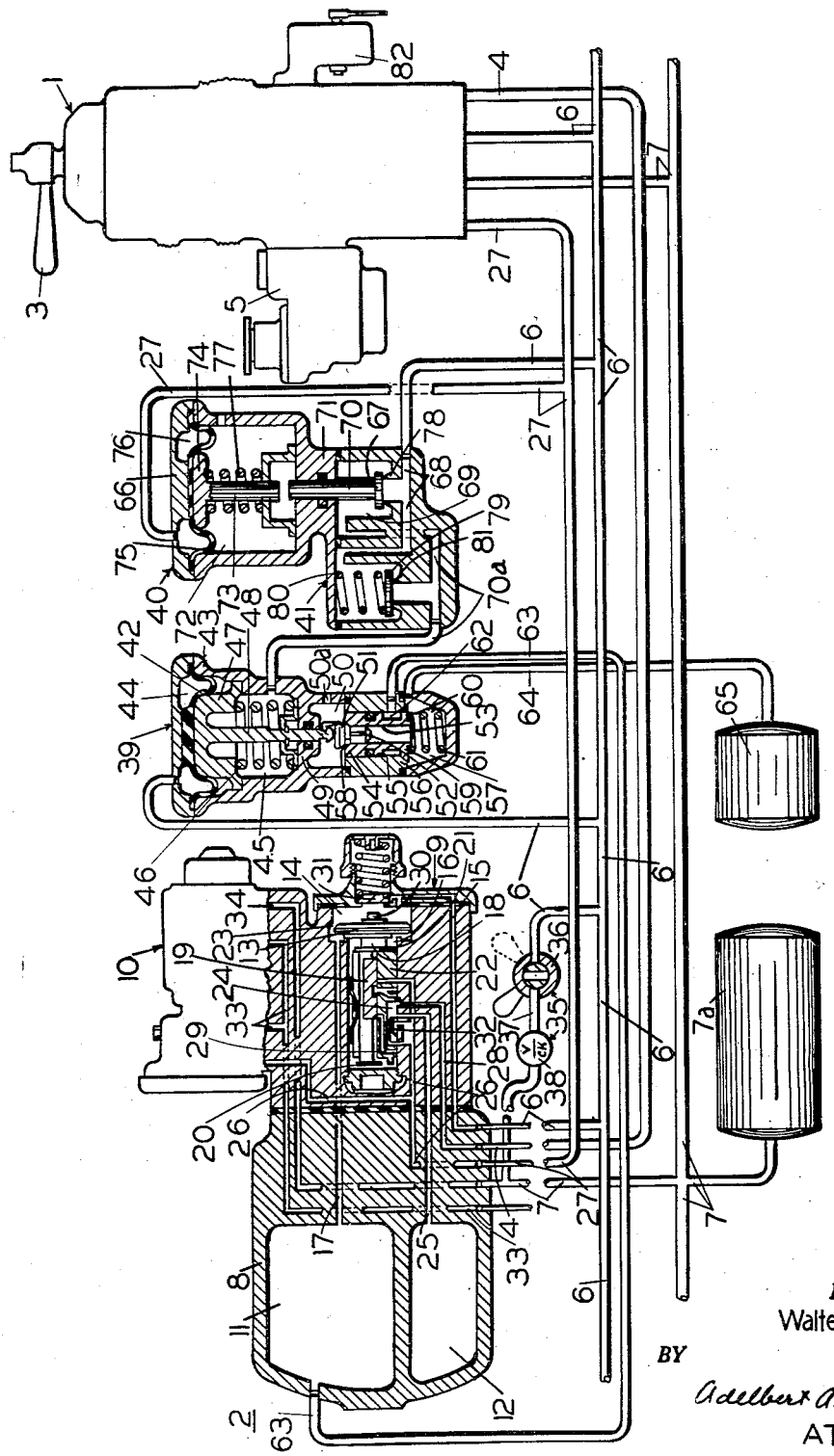

2,789,020

LOCOMOTIVE BRAKE APPARATUS

Walter T. Jados, Berwyn, Ill., assignor to Westinghouse Air Brake Company, Wilmerding, Pa., a corporation of Pennsylvania Application May 18, 1954, Serial No. 430,653

5 Claims. (Cl. 303—70)

This invention relates to brake apparatus and more particularly to the type adapted for use on railway locomotives.

The usual distributing valve device employed on railway locomotives comprises an equalizing portion containing an equalizing piston and a slide valve operative thereby and is subject opposingly to pressures of fluid in the usual brake pipe and in a slide valve chamber; the latter chamber being constantly open to a so-called pressure chamber, which is the equivalent of an auxiliary reservoir. The piston is adapted to respond to a reduction in brake pipe pressure to cause movement of the slide valve to an application position for causing an application of the locomotive and tender brakes; and said piston is adapted to respond to an increase in brake pipe pressure to cause movement of the slide valve to a release position for releasing said brakes and enabling recharging of the pressure chamber, by way of the usual feed groove, in by-pass of said piston.

This distributing valve functions very dependably when the locomotive is near the front of the train. However, there is a possibility that when the locomotive is hauled dead near the rear of the train, where variations in brake pipe pressure are more gradual, leakage past the piston and excessive slide valve friction or other causes may prevent a sufficient fluid pressure differential from being developed across said piston to move the slide valve to release position, with the result that the brakes on said locomotive will not release.

The principal object of this invention is therefore to provide an improved locomotive brake apparatus of the above type embodying means for insuring movement of the equalizing piston of a distributing valve to release position to effect release of the brakes on a locomotive even if such locomotive is hauled dead near the rear of a train.

According to this object, novel release insuring means are provided, comprising valve means adapted to respond to a relatively slight increase in brake pipe pressure during the initial phase of a brake release for opening the pressure chamber to a vented reservoir for thereby effecting a quick limited reduction in pressure in the pressure chamber and hence in the slide valve chamber sufficient to assure movement of the equalizing piston of a distributing valve to release position; whereupon said valve means will operate to disconnect said pressure chamber from said reservoir and connect the latter to atmosphere, so that said pressure chamber, but not said reservoir, will be recharged from brake pipe in the usual manner and fluid under pressure will be vented from reservoir.

Other objects and advantages will become apparent from the following description and from the accompanying drawing, wherein the single figure is a diagrammatic view, partly in section and partly in outline, of a brake apparatus embodying the invention.

Description

In Instruction Pamphlet No. 5046-15 of the Westinghouse Air Brake Company, dated July, 1952, there is shown and described a No. 6-SL Brake Equipment. Since the brake apparatus embodying the invention may, for sake of illustration, be basically of the No. 6-SL type, the disclosure in the accompanying drawing and in the following description has been limited to only such structure and operational characteristics as are deemed essential to a clear understanding of the invention.

Referring to the drawing, the improved brake apparatus comprises an engineer's automatic brake valve device 1 and a distributing valve device 2; the brake valve device 1 preferably being of the type designated in the aforementioned instruction pamphlet as the "KH-6-P Brake Valve," and the distributing valve device 2 preferably being of the type designated in said pamphlet as the "No. 6-KR Distributing Valve."

The engineer's automatic brake valve device 1 comprises valve means ( not shown) operable by movement of a handle 3 to a running position to connect a distributing valve release pipe 4 to atmosphere and to also connect the usual feed valve device 5 to a brake pipe 6 for charging the latter pipe with fluid under pressure from a main reservoir 7a by way of a main reservoir supply pipe 7 and said feed valve device. The brake valve device 1 is operable by movement of handle 3 to a service position for effecting any desired degree of service reduction in pressure in the brake pipe 6; and said valve device is operable by movement of said handle to a lap position for bottling up fluid in said brake pipe at the desired reduced pressure.

The distributing valve device 2 comprises a sectionalized casing 8 containing an equalizing portion 9, an application portion 10, a pressure chamber 11 for storing fluid under pressure in much the same manner as an auxiliary reservoir, and the usual application chamber 12.

The equalizing portion 9 comprises a piston 13 slidably mounted in the casing 8 and subject at one side to pressure of fluid in a chamber 14, which is open to the brake pipe 6 by way of a passage 15 and a branch of said brake pipe; said piston being subject at the opposite side to pressure of fluid in a chamber 16 which is constantly open to the pressure chamber 11 by way of a passage 17. The piston 13 has a stem 18 which projects into the chamber 16 and is connected to a graduating valve 19 which is movable with said stem. The stem 18 has outwardly directed radial shoulders 20, 21 which are spaced apart a slightly greater distance than the opposite ends of a main slide valve 22, such that after a certain initial movement of the piston 13 and stem 18 in one direction or an opposite direction one or the other of said shoulders is adapted to laterally engage the respective ends of the slide valve 22 for shifting said slide valve during continued movement of said stem in such direction, in the usual manner. The graduating valve 19 is mounted to slide on the main slide valve 22.

Upon supply of fluid under pressure to the brake pipe 6 and hence to chamber 14, such as during initial charging, the piston 13 is adapted to assume a normal or release position, in which it is shown in the drawing. With the piston 13 in release position, the usual feed groove 23 formed in the casing 8 connects the chambers 14, 16 in bypass of said piston for permitting fluid to flow, at a rate controlled by said feed groove, from the chamber 14 to the chamber 16 and pressure chamber 11 for thereby charging and maintaining the latter chambers charged to normal operating pressure in said brake pipe. And also, with the piston 13 in release position, the slide valve 22 is adapted to assume a release position, in which it is shown in the drawing.

With the slide valve 22 in release position, a cavity 24 therein is adapted to effect registry between a passage 25 leading to the application chamber 12, a passage 26 connected to an application cylinder pipe 27, and a passage 28 connected to the distributing valve release pipe 4; the latter pipe, as above stated being vented to atmosphere when the handle 3 of the brake valve device 1 is in running position. Hence, with slide valve 22 in release position, the application chamber 12 and application cylinder pipe 27 will be vented by way of the vented release pipe 4.

The piston 13 is adapted to respond to a reduction in pressure in the brake pipe 6 and hence in chamber 14 and move the slide valves 19, 22 from release position to an application position. During the initial phase of such movement, the piston 13 closes communication through the feed groove 23 and at the same time shifts the graduating valve 19 until the latter uncovers one end of a service port 29 to the slide valve chamber 16; the opposite end of said port 29 being blanked off by the casing 8 when the slide valve 22 is in release position. During continued movement of the piston 13 to application position, the shoulder 20 on stem 18 is adapted to laterally engage the adjacent end of the slide valve 22 and then, through such engagement, shift said slide valve to an application position, which position will be assumed when the piston 13 has attained its application position, defined by abutting engagement of a coaxially arranged stem 30 of said piston with a yieldable stop member 31 adjacent chamber 14.

With the slide valve 22 in application position, the cavity 24 will be in registry with only the distributing valve release passage 28; the service port 29 will connect the application cylinder passage 26 to the slide valve chamber 16; and a cavity 32 in said slide valve will also connect said application cylinder passage 26 to the passage 25 leading to application chamber 12. Hence under this condition, fluid under pressure from the pressure chamber 11 will flow via the slide valve chamber 16 and service port 29 to the application cylinder passage 26, whence it will flow not only to the application cylinder pipe 27 but also, via slide valve cavity 32, to the application chamber 12. When, by such flow, the pressure of fluid in pressure chamber 11 and hence in chamber 16 is reduced to a value slightly below that in the chamber 14, the piston 13 is adapted to move in the direction of chamber 16 to a lap position, in which the graduating valve 19 closes communication through the service port 29 and the shoulder 21 of piston stem 18 engages the slide valve 22 without shifting the same from application position. Under this condition, fluid under pressure will be bottled up in passage 26, pipe 27 and application chamber 12.

The application portion 10 of the distributing valve device 2 comprises piston and slide valve means (not shown) controlled by pressure of fluid in the application cylinder passage 26 and adapted when said passage is devoid of fluid under pressure to connect a brake cylinder passage 33 to atmosphere for thereby venting fluid under pressure from a brake cylinder device (not shown); said means being adapted, upon supply of fluid under pressure to passage 26, to supply fluid at substantially the same pressure to said brake cylinder passage 33 from a passage 34 connected to a branch of the main reservoir pipe 7.

The usual so-called dead engine fixture 35 is provided for permitting the main reservoir 7a to be charged from the brake pipe 6 when the locomotive is being hauled dead in a train and the compressors (not shown) on said locomotive are therefore inoperative. A sufficient volume of fluid under pressure is thus provided in the main reservoir 7a for supply to the aforementioned brake cylinder device upon a reduction in brake pipe pressure for applying the locomotive brakes. This dead engine fixture 35 comprises a manually operable dead engine cock 36 which is interposed between a branch of the brake pipe 6 and a pipe 37 that is connected to one side of a check valve 38 which, in turn, is connected at its opposite side to a branch of the main reservoir pipe 7. The check valve 38 is adapted to permit flow of fluid under pressure from the brake pipe 6 to the main reservoir 7a for charging the latter when the cock 36 is in an open position, and to prevent flow in the reverse direction; said cock being in a closed position, in which it is shown in the drawing, except when the locomotive is hauled dead in a train.

According to the invention, novel means are provided for insuring prompt movement of the equalizing piston 13 of the distributing valve device 2 to release position in response to a slight increase in brake pipe pressure following a brake application, for thereby assuring prompt release of the locomotive brakes even if the locomotive is hauled dead or dirt, leakage, or other factors tend to resist such movement of said piston. These novel means comprises a relay valve device 39, a two-way charging check valve device 40, and a release check valve device 41.

The relay valve device 39 is preferably of the pneumatically operated type and may, for sake of illustration, comprise a flexible diaphragm 42 suitably clamped adjacent its outer peripheral edge between portions of a sectionalized casing 43. The diaphragm 42 is subject at one side to pressure of fluid in a control chamber 44 constantly open to a branch of the brake pipe 6; and is subject at the opposite side to pressure of fluid in a chamber 45 and to action of a relatively light helical spring 46 disposed in the latter chamber and acting on a diaphragm follower 47 for urging said diaphragm to a normal position, in which it is shown in the drawing. Coaxially attached to the follower 47 is an actuating stem 48 which extends through the spring chamber 45 and projects through a casing partition 49 into an exhaust chamber 50 which is open to atmosphere via a port 50a; said stem having sealing, slidably guided engagement with the wall of an aligned bore in said casing partition. To the projecting end of stem 48 is coaxially connected an exhaust valve 51 having a fluted stem 52 which slidably engages the wall of an aligned bore 53 through a plunger 54 which, in turn, is slidable within an opening 55 through a casing partition 56 separating the exhaust chamber 50 from a delivery chamber 57. The fluted stem 52 assures proper alignment of the exhaust valve 51 with a tapered annular valve seat 58 formed in the end of plunger 54 adjacent the exhaust chamber 50 in encirclement of the bore 53. Formed integrally with the opposite end of plunger 54 is a valve 59 which is adapted to engage a tapered annular valve seat 60 formed in the casing partition 56 adjacent the delivery chamber 57 and in encirclement of the opening 55. A light helical spring 61 disposed in the delivery chamber 57 urges the valve 59 to a seated position against seat 60 for thereby normally closing said delivery chamber to a chamber 62 defined, in part, by an elongated annular groove formed in the outer periphery of the plunger 54 intermediate its ends.

The chamber 62 is constantly open by way of a pipe 63 to the pressure chamber 11 of the distributing valve device 2; whereas the delivery chamber 57 is constantly open by way of a pipe 64 to a reduction reservoir or volume 65, which is of such capacity as to effect a reduction in pressure in said pressure chamber at a rate and of a degree, relative to rate of increase in brake pipe pressure at the rear end of a long train in effecting a release of brakes on a train, sufficient to assure prompt movement of the equalizing piston 13 to release position.

In operation, when the diaphragm 42 is in normal position in which it is shown in the drawing and which it will assume under conditions to be later described, the exhaust valve 51 will be held unseated through the medium of the actuating stem 48, for thereby venting the reservoir 65 to atmosphere by way of the delivery chamber 57, bore 53 in plunger 54, fluted stem 52, unseated exhaust valve 51 and exhaust chamber 50; and the valve 59 will be maintained seated by action of spring 61.

When, however, the pressure of fluid in brake pipe 6 is increased to effect a release of brakes on a train, the consequent increase in pressure of fluid in the control chamber 44 will cause deflection of the diaphragm 42 to an application position against resistance of the light spring 46 and fluid pressure in the spring chamber 45, if and when brake pipe pressure exceeds the pressure in chamber 45 by a chosen degree, such as 5 p. s. i., and the resultant movement of stem 48 will successively cause seating of the exhaust valve 51 and then, through the medium of the seated exhaust valve, shift the plunger 54 for causing unseating of valve 59 against resistance of the light spring 61. Under this condition, fluid under pressure from the pressure chamber 11 will flow via pipe 63, chamber 62 and past unseated valve 59 to the delivery chamber 57, whence it will flow via pipe 64 to the reduction reservoir 65 for effecting a quick limited reduction in pressure of fluid in said pressure chamber.

It is to be noted that the spring 46 is relatively light for assuring prompt deflection of the diaphragm 42 to application position in response to a slight preponderance in brake pipe pressure acting in the control chamber 44 over that in the spring chamber 45. The pressure of fluid in the spring chamber 45 is controlled by operation of the check valve devices 40, 41 which will now be described.

The charging check valve device 40 may, for sake of illustration, comprise a sectionalized casing 66 containing a disc-shaped charging check valve 67 subject at one side to brake pipe pressure in a passage 68 leading to a branch of the brake pipe 6 and subject at the opposite side to pressure in a chamber 69 open via a conduit 70a to the spring chamber 45 of the relay valve device 39; said check valve being disposed in said chamber 69 and adapted to control flow from said brake pipe to said chamber 45 and to always prevent flow in the reverse direction. The check valve 67 has a coaxially arranged stem 70 which extends through chamber 69 and projects through a casing partition 71 into an atmospheric chamber 72; said stem having sealing, slidably guided engagement with the wall of an aligned bore through said casing partition. The projecting end of the stem 70 is adapted for abutting engagement with a depending end of a coaxially aligned stem 73, which at its opposite end is connected through the medium of a diaphragm follower 74 to a flexible diaphragm 75. The diaphragm 75 is suitably clamped adjacent its outer peripheral edge between portions of the casing 66 and separates the atmospheric chamber 72 from a pressure chamber 76; the latter chamber being connected to a branch of the application cylinder pipe 27.

In operation, when pipe 27 and hence chamber 76 are devoid of fluid under pressure by virtue of the main slide valve 22 of distributing valve device 2 being in release position, a helical spring 77 disposed in chamber 72 of device 40 will maintain the diaphragm 75 in a normal position, in which it is shown in the drawing. With diaphragm 75 in this position, the stem 73 will be so disposed as to permit fluid under pressure to unseat and flow past the check valve 67 from the brake pipe 6 to the spring chamber 45 of relay valve device 39. When, however, the pipe 27 and pressure chamber 76 are charged with fluid under pressure, by virtue of the slide valve 22 of device 2 being in application position, the diaphragm 75 will assume a locking position against resistance of spring 77. Under such condition, the diaphragm 75 will, through engagement of the stem 73 with the check valve stem 70, firmly hold the check valve 67 seated against an annular seat rib 78 encircling a branch of the passage 68, and thus positively prevent flow from the brake pipe 6 to the spring chamber 45, even when pressure in said brake pipe is increased above that in the latter chamber, for reasons hereinafter to be explained.

The release check valve device 41 comprises a preferably disc-shaped release check valve 79 interposed between a branch of the conduit 70a and a branch of passage 68 for permitting release of fluid under pressure from the spring chamber 45 of relay valve device 39 to the brake pipe 6 and preventing flow in the reverse direction; said check valve being subject, at the side adjacent said passage 68, to action of a light helical spring 80 for urging said check valve into engagement with an annular seat rib 81 encircling said branch of the conduit 70a.

It will thus be noted that the charging check valve device 40 permits charging of the spring chamber 45 from the brake pipe 6 except when the application cylinder pipe 27 is charged with fluid under pressure in consequence of the distributing valve equalizing piston 13 and main slide valve 22 being in their respective application positions. The release check valve device 41, on the other hand, assures that as fluid pressure in the brake pipe 6 is reduced during a brake application, pressure in the spring chamber 45 will be reduced to a substantially identical degree, so that with the diaphragm 75 of device 41 in locking position a subsequent slight increase in brake pipe pressure will result in a sufficient differential between the pressures of fluid in the control chamber 44 and spring chamber 45 of relay valve device 39 to cause deflection of the diaphragm 42 to application position against the resistance of the light spring 46.

*Live engine operation—Initial charging*

To charge the apparatus, the engineer moves the handle 3 of brake valve device 1 to running position for causing fluid under pressure to be supplied from the main reservoir 7a via the feed valve device 5 to the brake pipe 6 and at the same time causing the distributing valve release pipe 4 to be opened to atmosphere.

Some of the fluid under pressure thus supplied to the brake pipe 6 will flow via passage 15 to the equalizing piston chamber 14, for moving, if necessary, and then maintaining the equalizing piston 13 and slide valve 22 in their respective release positions. With piston 13 in such position, fluid under pressure will flow at a rate controlled by the feed groove 23 from chamber 14 to the slide valve chamber 16, whence it will flow via passage 17 to the pressure chamber 11 for charging the latter chamber to normal operating brake pipe pressure. And, with the slide valve 22 in release position as above described, the slide valve cavity 24 will be so disposed as to maintain the application chamber 12, application cylinder pipe 27 and passage 26 opened to atmosphere via the distributing valve release pipe 4 for thereby releasing brakes on the locomotive.

At the same time, some of the fluid under pressure supplied to the brake pipe 6 will flow to the control chamber 44 of the relay valve device 39 and also via passage 68 to one side of the charging check valve 67, thereby, with diaphragm chamber 76 vented via pipe 27, unseating said check valve and enabling fluid to flow via chamber 69 of charging check valve device 40 and conduit 70a to spring chamber 45 of said relay valve device 39.

It will thus be noted that both the control chamber 44 and the spring chamber 45 of relay valve device 39 will be charged with fluid at brake pipe pressure, and hence, the diaphragm 42 of relay valve device 39 will be maintained in normal position by action of the light spring 46. Under this condition, the reduction reservoir 65 will be opened to atmosphere by way of the unseated exhaust valve 51 of device 39 and the supply valve 59 of said device will be seated for closing off the pressure chamber 11 from reservoir 65, in the manner previously described in detail.

With the apparatus charged in the above manner, the various components of said apparatus will be in the respective positions in which they are shown in the drawing.

*Automatic service application of the brakes*

To initiate a service application of the automatic fluid pressure brakes on the locomotive, the engineer moves the handle 3 of brake valve device 1 to service position for effecting a desired degree of reduction in pressure in the brake pipe 6; whereupon he moves said handle to lap position for bottling up fluid in said brake pipe at the desired reduced pressure, in the usual manner.

Since the brake pipe 6 is in communication with the chamber 14 of distributing valve device 2, the pressure of fluid in this chamber will reduce with brake pipe pressure; such reduction being at a more rapid rate than that in the slide valve chamber 16 due to the restricted back-flow rate through the feed groove 23. The resultant differential in fluid pressure across the equalizing piston 13 therefore causes movement of said piston and the stem 18 to application position. During this movement, the piston 13 initially closes communication through the feed groove 23 and, through the medium of piston stem 18, shifts the graduating valve 19 relative to main slide valve 22 until the service port 29 is uncovered to the slide valve chamber 16; and then, as such movement of said piston continues, the shoulder 20 of stem 18 successively engages the slide valve 22 and then shifts said slide valve to application position. In such position, the main slide valve 22 will be so disposed as to disconnect the distributing valve release passage 28 from passage 26 and connect the latter to port 29 for enabling fluid under pressure to flow from the pressure chamber 11 via slide valve chamber 16 and port 29 to said passage 26. Fluid under pressure thus supplied to passage 26 will flow to the application chamber 12 and application portion 10 for causing operation of said portion, in the manner previously described, to effect a corresponding degree of application of the locomotive brakes. And some of the fluid under pressure supplied to passage 26 will flow, via slide valve cavity 32, to the application cylinder pipe 27, in the usual manner. Some of the fluid under pressure supplied to pipe 27 will flow to the pressure chamber 76 of charging check valve device 40 and cause the diaphragm 75 to deflect, against resistance of spring 77, to locking position, in which the diaphragm stem 73 engages the check valve stem 70 for holding the charging check valve 67 firmly seated.

It will be noted that during the above-described reduction in brake pipe pressure, the pressure in the control chamber 44 of relay valve device 39 will be reduced a like degree, since said chamber is directly open to a branch of said brake pipe; and, at the same time, the pressure in spring chamber 45 of said device will be reduced to substantially the same degree by virtue of unseating of the release check valve 79 against resistance of the light spring 80 and consequent release of fluid under pressure from said spring chamber into the brake pipe 6. Hence, so long as the locomotive brakes are applied, the relay valve diaphragm 42 will remain in normal position for disconnecting the pressure chamber 11 from the reservoir 65 and connecting said reservoir to atmosphere.

*Automatic release of the service application of brakes*

To effect a release of the locomotive brakes following a service application thereof, the brake valve handle 3 is moved to running position for opening the distributing valve release pipe 4 to atmosphere and also supplying fluid under pressure to the brake pipe 6 in the same manner as heretofore described in connection with initial charging of the apparatus.

Some of the fluid under pressure thus supplied to the brake pipe 6 will flow to the control chamber 44 of the relay valve device 39 and also to the passage 68; but since the charging check valve 67 is held seated by effect of fluid pressure in the diaphragm chamber 76, fluid will be bottled up in the spring chamber 45 of said relay valve device at a pressure corresponding substantially to that in the brake pipe at the end of effecting the service application of brakes unless and until the slide valve 22 moves to release position and vents pipe 27 for thereby causing valve device 40 to return to normal position for allowing pressure in the spring chamber 45 to increase substantially with brake pipe pressure via the check valve 68. Hence, if and when the pressure in control chamber 44 increases sufficiently, such as the illustrative 5 p. s. i. over the reduced pressure of fluid bottled up in chamber 45, the diaphragm 42 will deflect to application position, against resistance of light spring 46 and such reduced pressure for thereby opening the pressure chamber 11 to the reduction reservoir 65 by way of pipe 63, unseated valve 59 and pipe 64, in the manner previously described in detail. Under this condition, fluid under pressure will be quickly released from the pressure chamber 11 and slide valve chamber 16 into the previously vented reservoir 65, for thereby assuring that a sufficient fluid pressure differential will be developed across the equalizing piston 13 to cause movement of said piston to release position, as will be understood from previous description. During this movement of piston 13, the main slide valve 22 will be shifted to release position through engagement of shoulder 21 on piston stem 18 with said slide valve, as previously described in detail.

With slide valve 22 in release position, the application chamber 12, application passage 26 and application cylinder pipe 27 will be opened to atmosphere via slide valve cavity 24 and the distributing valve release pipe 4 for thereby causing operation of the application portion 10 to release the locomotive brakes. With the pipe 27 thus opened to atmosphere, fluid under pressure will be released from the diaphragm chamber 76 of charging check valve device 40 causing the diaphragm 75 to be deflected to normal position by action of spring 77. Under this condition, pressure of fluid in passage 68 will unseat the charging check valve 67, enabling fluid under pressure to flow from the brake pipe 6 to the spring chamber 45 of the relay valve device 39 until pressure in the latter chamber substantially equalizes with that in the brake pipe 6 and hence with that in the control chamber 44; whereupon the diaphragm 42 will be deflected by spring 46 to normal position. Under this condition, the relay valve device 39 will close communication between the pressure chamber 11 and reservoir 65 and open said reservoir to atmosphere by successive seating of the valve 59 and unseating of the exhaust valve 51, as will be understood from previous description.

With the piston 13 in release position, fluid under pressure from the brake pipe 6 will flow via chamber 14 and feed groove 23 to the slide valve chamber 16 and to the pressure chamber 11 for recharging the latter chambers to normal operating brake pipe pressure, as explained in connection with initial charging of the apparatus.

It will thus be noted that the relay valve device 39 operates to open the reduction reservoir 65 to the pressure chamber 11 for thereby releasing fluid under pressure from said pressure chamber into said reservoir if the equalizing piston 13 has not moved to release position; by the time brake pipe pressure exceeds the pressure in chamber 45 by the illustrative 5 p. s. i.

The check valve devices 40, 41 cooperate to assure that pressure of fluid on opposite sides of the relay valve diaphragm 42 will be normally maintained at existing brake pipe pressure for maintaining said diaphragm in normal position; however, the device 40 prevents recharging of the chamber 45 at one side of said diaphragm upon charging of the control chamber 44 at the opposite side thereof during the initial phase of a brake release and thus causes a fluid pressure differential to be created across said diaphragm 42 for moving same to application position and thereby assuring movement of the equalizing piston 13 to release position. With piston 13 in release position, the check valve device 40 is operative to permit recharging of the chamber 45 of relay valve device 39.

Dead engine operation

When a locomotive equipped with the improved apparatus is to be hauled dead in a train, the engineer closes the usual double heading cock 82 on the brake valve device 1 for closing off said device from the brake pipe 6; moves the brake valve handle 3 to running position; and also moves the dead engine cock 36 to an open position, from a closed position in which it is shown in the drawing, so that the brakes on the locomotive will be controlled in a manner very similar to that on the connected cars of a train, in accordance with the usual practice.

Initial charging of the apparatus is accomplished by flow of fluid under pressure from the brake pipe 6 through cock 36 and through the check valve 38 to the main reservoir pipe 7. Fluid under pressure thus supplied to pipe 7 will flow to the main reservoir 7a for charging said reservoir to normal operating brake pipe pressure and will also flow through the brake valve device 1 to the distributing valve device 2, by way of the communication previously described in connection with initial charging during live engine operation.

Application and release of the brakes on the dead locomotive will be controlled by variations in brake pipe pressure as effected by operation of a brake valve device on the live locomotive and transmitted through the brake pipe on the adjacent car; the distributing valve device 2, relay valve device 39 and check valve devices 40, 41 being operative in the same manner as previously described in detail in connection with live engine operation.

It will thus be seen that even if the dead locomotive is hauled at the rear of the train, where variations in brake pipe pressure are relatively gradual, the diaphragm 75 of check valve device 40 will remain in locking position, when brake pipe pressure is increased for releasing a brake application, until by operation of the relay valve device 39 the pressure of fluid in the pressure chamber 11 is reduced to a degree sufficient to cause positive movement of the equalizing piston 13 to release position, in the manner above described.

Summary

It will now be seen that the improved locomotive brake apparatus embodies novel means for positively insuring movement of the equalizing piston of a distributing valve to release position upon an increase in brake pipe pressure following a brake application; and that such positive movement is assured even if a locomotive provided with such apparatus is being hauled dead near the rear of a train.

Having now described the invention, what I claim as new and desire to secure by Letters Patent, is:

1. In a fluid pressure brake apparatus, in combination, a brake pipe, a valve device subject to opposing pressures in said brake pipe and in a chamber and operative upon a reduction in brake pipe pressure to effect an application of brakes and operative upon a preponderance of pressure in said brake pipe over that in said chamber to effect a release of brakes, a communication charged with fluid under pressure during an application of brakes and vented to atmosphere upon a release of brakes, a conduit, first valve means subject to opposing fluid pressures in said brake pipe and conduit and operative to release fluid under pressure from said chamber only when pressure in said brake pipe exceeds that in said conduit, second valve means for permitting release of fluid under pressure from said conduit into said brake pipe and preventing flow therethrough in the reverse direction, third valve means for permitting flow from said brake pipe to said conduit in by-pass of said second valve means and preventing such by-passing flow in the reverse direction, and fourth valve means controlled by pressure of fluid in said communication and effective to prevent flow of fluid under pressure from said brake pipe to said conduit via said third valve means whenever said communication is charged.

2. In a fluid pressure brake apparatus, in combination, a brake pipe, another pipe, first valve means controlled by opposing pressures of fluid in said brake pipe and in a chamber and responsive to a reduction in pressure in said brake pipe below that in said chamber to move to a brake application position for effecting an application of brakes and supplying fluid under pressure to said other pipe and responsive to a preponderance of pressure in said brake pipe over that in said chamber to move to a brake release position for effecting a release of brakes and venting said other pipe, a reservoir, a conduit, second valve means subject to opposing fluid pressures in said brake pipe and conduit and operative when such opposing pressures are substantially equal to a normal position for connecting said reservoir to atmosphere and operative when pressure in said brake pipe preponderates over that in said conduit by a chosen degree to another position for releasing fluid under pressure from said chamber into said reservoir, third valve means for permitting release of fluid under pressure from said conduit into said brake pipe and preventing flow therethrough in the reverse direction and fluid pressure operable valve means responsive to charging of said other pipe to move to one move to another position for permitting flow from said conduit and responsive to venting of said other pipe to move to another position for permitting flow from said brake pipe to said conduit in by-pass of said third valve means.

3. In a fluid pressure brake apparatus, in combination, a brake pipe, a communication, a valve device comprising movable abutment means subject to opposing fluid pressures in said brake pipe and in a pressure chamber and operative upon a reduction in brake pipe pressure to supply fluid under pressure from said chamber to said communication for causing an application of brakes and operative upon a subsequent increase in brake pipe pressure relative to chamber pressure to vent said communication for causing a release of brakes, a conduit, a reservoir, relay valve means controlled by opposing fluid pressures in said brake pipe and conduit and operative to a normal position for opening said reservoir to atmosphere except when pressure in said brake pipe exceeds that in said conduit by a chosen degree and then operative to another position for opening said reservoir to said chamber, a first check valve for normally permitting flow of fluid under pressure from said brake pipe to said conduit and preventing flow in the reverse direction, a second check valve interposed between branches of said brake pipe and conduit for permitting release of fluid under pressure from said conduit to said brake pipe and preventing flow therethrough in the reverse direction, and means including a movable abutment controlled by pressure of fluid in said communication and normally biased to one position for permitting operation of said first check valve and movable to another position upon supply of fluid under pressure to said communication for preventing flow from said brake pipe to said conduit via said first check valve so as to cause operation of said relay valve means to said other position in response to a subsequent increase in brake pipe pressure.

4. In a locomotive brake apparatus, a brake pipe, an application pipe, and a distributing valve device comprising an equalizing portion responsive to a reduction in pressure in said brake pipe below that in a pressure chamber to supply fluid under pressure from said pressure chamber to said application pipe and also effect an application of brakes and operative by a preponderance in pressure in said brake pipe over that in said pressure chamber to release fluid under pressure from said application pipe and effect a release of brakes, in combination with a reservoir, a conduit, a relay valve device for opening said reservoir selectively to atmosphere or to said pressure chamber according to whether pressure in said brake pipe is substantially equal to or greater than that in said conduit, respectively, release check valve means for permitting release of fluid under pressure from said conduit into said brake pipe and preventing flow in the reverse direction, and two-way charging check valve means normally permitting flow of fluid under pressure from said brake pipe to said conduit in by-pass of said release check valve means and responsive to charging of said application pipe to prevent such by-passing flow.

5. In a fluid pressure brake apparatus, in combination, a brake pipe, a fluid pressure communication, a valve device responsive to a reduction in pressure in said brake pipe below that in a pressure chamber to supply fluid under pressure from said chamber to said communication for causing an application of brakes and responsive to a preponderance in pressure in said brake pipe over that in said chamber to release fluid under pressure from said communication for causing a release of brakes, a conduit, first valve means subject to opposing pressures of fluid in said brake pipe and conduit and responsive to an increase in brake pipe pressure in excess of a chosen degree above conduit pressure to release fluid under pressure from said chamber, and second valve means responsive to charging of said communication to prevent flow of fluid under pressure from said brake pipe to said conduit and responsive to venting of said communication to permit such flow.

References Cited in the file of this patent
UNITED STATES PATENTS

| | | |
|---|---|---|
| 1,185,947 | Snyder | June 6, 1916 |
| 1,494,734 | Clark | May 20, 1924 |
| 1,802,916 | Hier | Apr. 28, 1931 |
| 1,927,932 | Farmer | Sept. 26, 1933 |
| 2,035,046 | Cook et al. | Mar. 24, 1936 |